United States Patent
Peacock et al.

(10) Patent No.: US 6,832,462 B2
(45) Date of Patent: Dec. 21, 2004

(54) PROCESS FOR MAKING TUBE BLANKS

(75) Inventors: Adam Peacock, Merseyside (GB);
Kevin John Stamp, Merseyside (GB)

(73) Assignee: Unilever Home & Personal Care USA, Division of Conopco, Inc., Greenwich, CT (US)

( * ) Notice: Subject to any disclaimer, the term of this patent is extended or adjusted under 35 U.S.C. 154(b) by 0 days.

(21) Appl. No.: 10/445,454

(22) Filed: May 27, 2003

(65) Prior Publication Data

US 2004/0016279 A1 Jan. 29, 2004

(30) Foreign Application Priority Data

May 30, 2002 (GB) .............................................. 0212550

(51) Int. Cl.$^7$ .............................. B65B 9/20; B65B 6/18
(52) U.S. Cl. .............................. 53/412; 53/451; 53/456; 53/133.2; 53/547; 53/551; 53/567
(58) Field of Search .............................. 53/374.8, 552, 53/559, 412, 456, 451, 133.2, 547, 567, 551

(56) References Cited

U.S. PATENT DOCUMENTS

| | | |
|---|---|---|
| 2,422,750 A | 6/1947 | Rue |
| 2,455,461 A | 12/1948 | Anderson |
| 2,760,551 A | 8/1956 | Downey et al. |
| 3,322,044 A | 5/1967 | Welin-Berger |
| 3,354,601 A * | 11/1967 | Schneider et al. ............. 53/456 |
| 3,432,986 A * | 3/1969 | Schneider et al. ............. 53/547 |
| 3,603,217 A | 9/1971 | Wright et al. |
| 3,960,624 A | 6/1976 | Erlandson |
| 4,330,351 A | 5/1982 | LoMaglio |
| 4,924,655 A * | 5/1990 | Posey ........................ 53/133.2 |
| 5,634,324 A | 6/1997 | Schmachtel |
| 5,730,694 A * | 3/1998 | Hagleitner ................... 493/210 |
| 5,943,840 A * | 8/1999 | Nilsson et al. ............. 53/133.2 |
| 6,085,491 A * | 7/2000 | Bois ............................. 53/412 |
| 6,182,426 B1 * | 2/2001 | Pritchard .................... 53/133.2 |
| 6,581,357 B1 * | 6/2003 | Lindenberger ............... 53/412 |

FOREIGN PATENT DOCUMENTS

| | | |
|---|---|---|
| DE | 971 064 | 7/1949 |
| DE | 1 228 395 | 6/1960 |
| DE | 1 144 174 | 7/1960 |
| DE | 44 29 148 | 7/1994 |
| EP | 0 719 634 | 4/1999 |
| GB | 1 582 777 | 1/1981 |
| GB | 2 163 124 | 2/1986 |

* cited by examiner

Primary Examiner—John Sipos
(74) Attorney, Agent, or Firm—Milton L. Honig

(57) ABSTRACT

A process for the manufacture of a tube blank, comprising the following steps:
(a) forming a tube hose around a mandrel and advancing the said tube hose along the said mandrel such that a leading edge of the said tube hose is flush with a leading face of the said mandrel;
(b) presenting a dispensing assembly to the said leading edge of the said tube hose;
(c) sealing the dispensing assembly with the said tube hose to form a tube blank;
(d) separating the tube blank from the mandrel.

16 Claims, 3 Drawing Sheets

PROCESS FOR MAKING TUBE BLANKS

BACKGROUND OF THE INVENTION

1. Field of Invention

The present invention relates to a process for making flexible or squeezable containers, preferably tubes. The invention also relates to the tube blank produced as a result of the said process and also to resulting sachets and filled tubes.

2. The Related Art

Tubes are cheap and easy to use containers for flowable substances, especially for viscous liquids and pastes. Whether for comestibles, medicaments, washing compositions, cosmetic substances or glues a tube comprises a bag, which defines a reservoir for containing a substance and a dispensing assembly for dispensing said substance. Commonly, it also comprises a means for re-sealing the tube which is usually associated with the dispensing assembly.

Considering their simple nature the apparatus for making a tube is often complex and expensive. It is usual that one piece of apparatus makes the tube, a further piece of apparatus attaches a dispensing assembly and further pieces of apparatus fill and perhaps a further device for sealing it. This requires that there is yet a further piece of apparatus for transporting the tube being formed between the different pieces of apparatus. The partially formed tube must be strong and rigid enough in its partially formed state to be transported and handled. In many cases partially formed tubes are stored and/or transported in this condition.

Such a chain of events dictates that producing a product packaged in a tube is a lengthy and complicated process.

Commonly, tubes are manufactured from a single sheet of material, which is typically a plastic, often a laminated plastic. The sheet is cut, wrapped around a mandrel and sealed longitudinally to form a cylindrical tube hose. This hose is usually cut to length and taken off the mandrel before being stored for further processing.

A dispensing assembly is usually attached before the tube is filled and sealed although this is not necessarily the case with sachets. Here it is more usual for the bag to be sealed at three of the four edges before being filled and then sealed and provided with a dispensing assembly.

Typical of the prior art is DE 44 29 148 which discloses a method for manufacturing, filling and sealing tubes. The method requires that a tube hose is formed around a mandrel, sealed at one end and then cut to produce an empty cylindrical container open at one end. This is then transferred to a second mandrel which fills the container and moulds a dispensing assembly before fitting a cap.

U.S. Pat. No. 3,354,601 (Schneider) describes a method for making a tube comprising forming a tube hose around a mandrel and then abutting a dispensing assembly upon the mandrel. The tube hose is then advanced into contact with the dispensing assembly before the mandrel is withdrawn. The tube hose is then welded onto the dispensing assembly. The tube blank is then transported to a separate filling machine.

It is an object of the present invention to reduce the time necessary to produce such a product thereby reducing costs and improving productivity.

SUMMARY OF THE INVENTION

Accordingly, the first aspect of the present invention provides a process for the manufacture of a tube blank, comprising the following steps:

(a) forming a tube hose around a mandrel and advancing the said tube hose along the said mandrel such that a leading edge of the said tube hose is flush with a leading face of the said mandrel;

(b) presenting a dispensing assembly to the said leading edge of the said tube hose;

(c) sealing the dispensing assembly with the said tube hose to form a tube blank;

(d) separating the tube blank from the mandrel.

DETAILED DESCRIPTION OF THE INVENTION

By tube blank is meant a flexible container with a first and second end, which first end is closed with a dispensing assembly and second end is open.

By tube hose is meant a tubular container, preferably a more or less cylindrical container, which is capable of serving as the bag portion of a tube or sachet when adequately sealed.

The first stage of the method requires the formation of a tube hose around the outside surface of a mandrel. The material for the tube hose is fed from a supply, usually a reel, where it is guided around a mandrel as described in EP-B1-0 719 634. In EP-B1-0 719 634 the hose are sealed longitudinally and cut and sealed transversely to produce container blanks. However, in the present invention the tube hose is maintained around the mandrel until the dispensing assembly is fitted. More specifically, the hose is advanced along the mandrel such that the leading edge of the tube hose is flush with the leading face of the mandrel. Accordingly, when the dispensing assembly is registered with the leading face of the mandrel it also sufficiently contacts the leading edge of the tube hose such that sealing between the dispensing assembly and the tube hose can occur. It is noted that it is the intention of this invention to simplify the process for manufacture of tubes and so it is preferred that the tube hose is formed around a mandrel and the tube hose material is fed from a supply and longitudinally sealed around the mandrel and not pre-fabricated.

In the present invention the longitudinal seal is formed by a convection or conduction heating-means. Preferably the heating means presses the tube hose margin overlap onto the mandrel. The subsequent heat forms a weld. Optionally, a co-operating heated section is provided on the mandrel so that the tube hose margin overlap is heated from both sides.

Any material suitable for forming a tube or sachet may be used in the present invention. The choice of material will be governed partly by the properties of the product to be contained in the tube and partly by the physical requirements of the tube both during processing and after filling. As explained below the process of the present invention allows greater flexibility in the choice of material by removing some of the constraints on tube properties during the forming and filling process.

Tubes are commonly formed from thermoplastic materials. Often thermoplastic laminates containing one or more layers of metal foil are used. Such thermoplastic sheets and laminates are commonly sealed together by heat welding. However, the process of the present invention is not limited to the use of thermoplastic sheet to form tubes or to the use of heat welding to form seals. Other materials, such as for example metal foils, can be used and joints formed using contact and/or heat sensitive adhesives applied to the overlap regions. It is also envisaged that a folded seam can be produced as the sheet of material is applied to the mandrel and that this folded seam be compressed by the heating means described above, optionally with the heating turned off.

It has been found that the process of forming the tube hose in this way can be improved by a multi stage welding process. Preferably, the heater which produces the weld is sized such that its length corresponds to a number of times the desired length of the final tube blank. In continuous operation the heater is thus applied to the seam for a fraction the time normally required to form a complete weld for each individual tube hose blank. The heater is then removed and the tube hose indexed by one final tube length. The heater is then re-applied. A first section of the heater contacts the tube over the partially formed weld and completes the weld. A second part of the heater helps form the partial weld on the next tube to be formed. Subsequent sections of heater form earlier partial welds. Normally, a two-stage welding process is sufficient. In this way the cycle time to form a tube can be reduced by up to around 50%.

If, as is preferred, the tube hose material is fed from a reel it is also necessary that it is transversely cut at an appropriate moment. This can be done at any time after forming around the mandrel but it is preferred that it is done at the same time that the tube hose is being longitudinally sealed or soon afterwards.

It is to be understood that the term mandrel is meant a device for supporting the tube hose.

The operating principle of the present invention requires that the mandrel perform several functions. It must form a surface on which the sheet of material can form a tube hose. It must allow the tube hose to slide over it in response to an external drive. It must support the tube hose while a dispensing assembly is applied to and sealed on to the end of the tube hose. Optionally, it may provide heat to form the side seam weld.

Since the material forming the tube hose is flexible, it is not necessary that the mandrel have the same cross section as the final tube, provided the circumference is correct. The shape of the mandrel cross section need not be the same throughout the length of the mandrel. For example, it may be advantageous to have a flat portion on the mandrel cross section in the position where the seam weld is being formed. It has also been found that an oval cross section is advantageous. It allows for more convenient arrangement of the various means which may need to be incorporated inside the mandrel. It also allows better contact between the external drive belt and the material forming the tube hose.

The dispensing assembly is normally heat sealed and/or crimped to the leading edge of the tube hose. The dispensing assembly is preferably heated over the intended contact area between the dispensing assembly and tube hose, preferably by hot air, before being placed in contact with the end of the tube hose at the end of the mandrel. Optionally, the end of the tube hose may also be heated if necessary to provide a good seal. However, it has been found that a neater finished appearance is achieved if only the dispensing assembly is heated.

Preferably the dispensing means is presented to the tube hose by a combined heating and transfer tool. The tool retrieves a dispensing assembly from a supply magazine and transports it into position at the leading edge of the tube hose. While the transfer is taking place the end of the dispensing assembly to be sealed is heated by hot air which circulates around the end to be heated. This reduces the time between applying heat and forming the weld thereby reducing the amount of heat which dissipates into the dispensing assembly.

Preferably, the tube hose is cut to length and the cut tube hose indexed forward on the mandrel to the correct position for contacting the dispensing assembly. It may be necessary to slightly adjust the position of the mandrel to ensure the correct overlap for the seal to be formed between the cut tube hose and the dispensing assembly. This can be carried out in a number of ways; for example using a system of index marks and an optical control system. However, it may simply and conveniently be carried out using a fork mechanism which slides around the dispensing assembly and raises the cut tube hose to the correct position before being welded and withdrawn.

The seal can be effected by crimping the surfaces of the tube hose and the dispensing assembly together to form a weld seal. Preferably this seal is effected by a crimping means split into two or more sections. The sections come together and are then applied to the weld area in a direction parallel to the long axis of the tube hose to form a continuous seal between the tube hose and dispensing assembly. They can then be split apart again to allow the tube blank to be withdrawn from the mandrel through the open jaws of the crimping means. This arrangement allows the crimping process to be carried out without the delay associated with prior art processes. Specifically, it allows a separate device to grip the sealed tube blank while the crimper is being removed and/or allows the transfer means to transfer the next dispensing assembly to the next tube hose edge.

The split-jaw crimping means also allows the dispensing assembly transfer means to be removed from the dispensing assembly immediately after the pre-heat dispensing assembly has been left in contact with the leading edge of the tube hose. Thus, crimping means may be as close as possible to said dispensing assembly without the pre-heated assembly cooling down. Should this split-jaw system not be employed the dispensing assembly would have to be heated to a higher temperature in order to compensate for the longer cooling time between heating and crimping.

Optionally, this air circulation may continue when the dispensing assembly is presented to the end of the tube hose so that the end of the tube hose is also heated before the seal is formed. To avoid hot air passing between the formed tube hose and the mandrel and thus breaking the newly formed seam weld along the tube length before it has time to cure a seal can be provided on the mandrel remote from the end of the tube hose. Such a seal may be an 'O' ring or similar device which prevents the hot air from passing between the mandrel and the tube hose.

Other methods of heating the dispensing assembly and/or the end of the tube hose are also envisaged in the present invention. Such means include, but are not limited to, induction heating, electrical resistance heating, radiant heat and lasers.

This procedure has the advantage that a number of process steps are combined onto one mandrel, thus reducing the total cycle time for tube formation and simplifying the machinery.

Once the dispensing assembly is welded to the tube hose a pick up tool applied to the end of the tube blank. The crimping means is split and the tube blank withdrawn from the mandrel. Alternatively, the crimping tool and tube grippers can serve to withdraw the tube blank from the mandrel. The crimping tool can open to allow a pick up tool to receive the tube blank. If the tube blank has not already been cut to length it is indexed forward until the required length has been withdrawn and the tube blank then cut by a cutting means. The cut tube blank is then withdrawn from the mandrel as described and transferred to the next stage of the process.

Another advantage of this process arises because the tube hose is supported by the mandrel during substantially all of the forming process until the dispensing assembly is welded to it to form the tube blank. This means that there is no requirement that the tube hose be in any way self supporting or that it has sufficient rigidity to enable it to maintain a tubular shape unsupported. This allows the use of materials which are more flexible than can otherwise be used. This can allow the use of different materials to form the tube hose and/or can allow the use of thinner sheets of material. In this way the range of materials which can be used to form tubes is increased and potential cost savings are possible by using thinner sheets of material.

In another aspect of the invention the tube blank can be filled and sealed immediately after it is formed. This is achieved by using a mandrel which has a filling tube running through its centre connected at one end to a reservoir containing the material to be filled into the tube blank. The other end comprises a dispensing means. A metering means is also provided to control the amount of material fed into the tube blank.

In operation, the tube blank is filled as it is removed from the mandrel after welding the dispensing means to its end. Preferably, instead of simply cutting the tube blank to length a sealing means is used to form the finished filled tube after the filled tube blank is withdrawn from the mandrel.

The withdrawal from the mandrel while simultaneously filling the tube blank further increases the speed of manufacture. It also allows the use of almost any flexible material to form the tube. The only requirement is that the material be strong enough to contain the contents of the filled tube.

The withdrawal from the mandrel while simultaneously filling the tube blank has the further advantage that sterile filling of tubes is made more easy and convenient. Provided all the starting materials are sterile, or are sterilised immediately before use, and the machine is maintained in a sterile condition, a sterile sealed package is formed in one operation. Once produced, further precautions need not be taken to protect the tube contents.

It is of course important to ensure that, when simultaneously filling in this way, the surfaces to be sealed are not contaminated with the product being filled into the tube. Such contamination can occur directly as the product enters the tube or indirectly by contamination of the tooling. Standard techniques are used to control this contamination, including controlling the filling rate, proper design of the filling nozzle geometry and the closing valve and by control of airflow in the vicinity of the product entering the tube.

Although the invention has been described in relation to the manufacture of tubes it may also be used for the manufacture of similar filled and sealed containers such as sachets. The method of presenting the dispensing assembly to the tube hose can also be used to apply improved resealable sachet dispensing assemblies.

Resealable sachet dispensing assemblies in the prior art typically comprise a neck, the cross-section of which is a generally eye-shaped portion with a centrally located dispensing channel. The eye-shaped portions are generally inserted after the bag has been sealed on three sides and filled. The corners of the open end of the bag are clamped and moved towards each other to provide an opening big enough to allow insertion of an eye-shaped dispensing assembly. The size and shape of the dispensing assembly is, therefore, limited by the manufacturing procedure.

By using the process according to the present invention any shape of dispensing assembly can be used for a resealable sachet because it is sealed to the sachet before the sachet is filled.

Thus in another aspect the invention provides for a flexible or squeezable container made by any of the methods of the previous aspects of the invention. Preferably, the container is a sachet, especially a resealable sachet.

Particular embodiments of the invention will now be described with reference to the drawings.

The description and examples illustrate selected embodiments of the present invention. In light thereof variations and modifications will be suggested to one skilled in the art, all of which are within the spirit and purview of this invention.

DETAILED DESCRIPTION OF THE DRAWINGS

Figure 1:
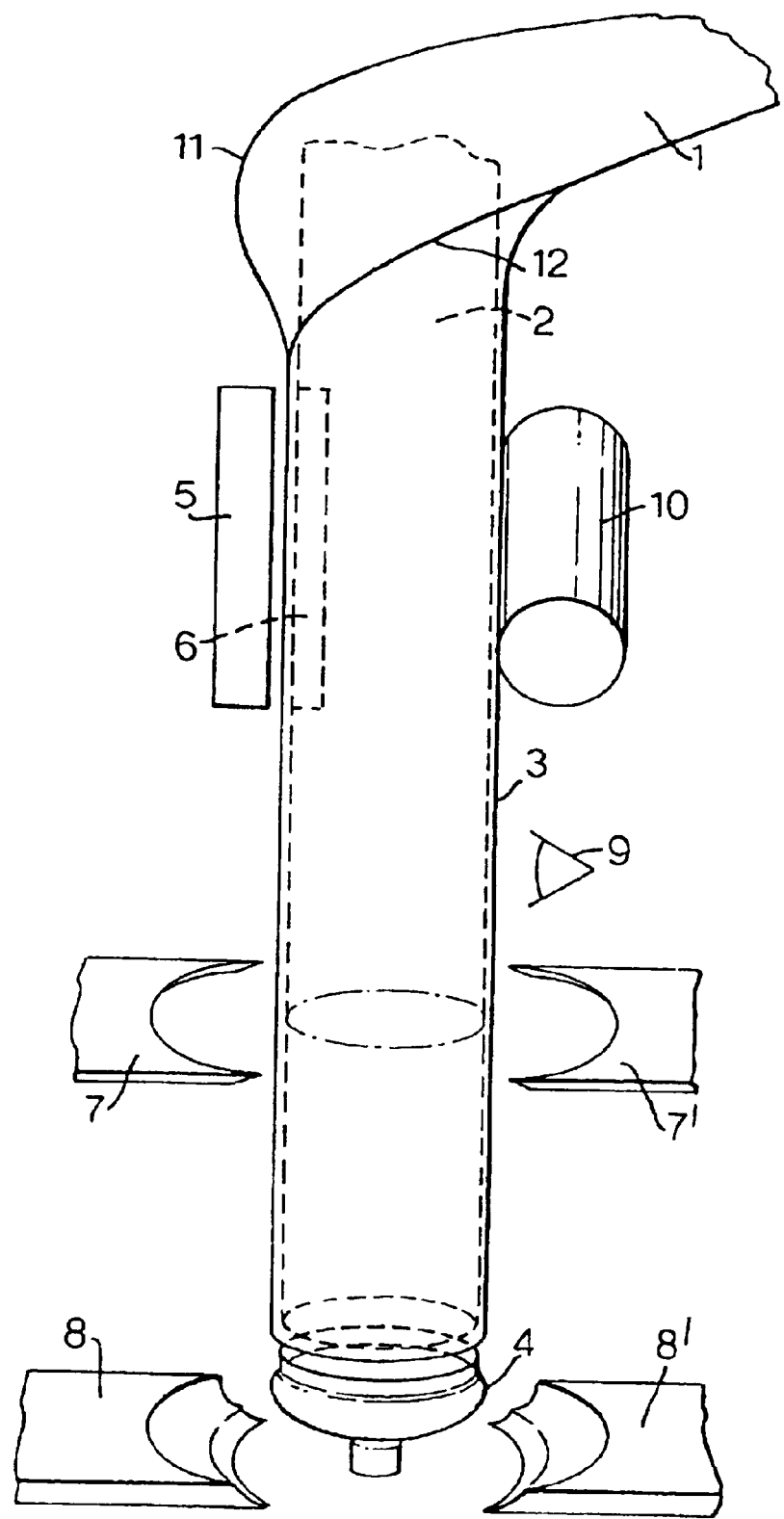
FIG. 1 is a schematic of the operation of a machine which carries out the process according to the invention.

In detail, FIG. 1 shows a schematic representation of the operation of a machine which carries out the process according to the invention. The machine is rotated by 90° anticlockwise to facilitate its presentation.

A sheet of laminate (1) is drawn from a roll (not shown) and guided round mandrel (2) to form a tube hose (3) by overlapping edges (11) and (12) of the sheet. In the aspect shown the tube hose is drawn onto and down the mandrel by a friction belt drive (10). This drive is intermittent, advancing the tube hose by an indexed length each time. Optionally, a sensor (9) may be used to detect index marks on the tube hose and, via a control system, ensure the correct advance of the tube. The overlapping edges of the sheet are welded together during an index pause by pressure mean (5) which applies pressure to the overlap as heating means (6) in the mandrel pressure means heat the overlap area.

The dispensing assembly (4) is welded to the bottom of tube hose (3), also during an index pause. The dispensing assembly (4) is heated and presented o the bottom of tube hose (3) by a mechanism described in detail below. Optionally, he bottom of tube hose (3) also heated. The crimping means (8)/(8') is split to low the dispensing assembly to be presented to the bottom of the tube hose (3). Once the mechanism doing this has been withdrawn the two parts of the crimping means are brought together and raised to push and crimp the tube hose end around the dispensing assembly to weld it to the end of the tube hose. Once the joining operation is complete the crimping means is split apart again to allow a transfer means to attach to the end of the dispensing assembly.

Cutters (7)/(7') cut the tube hose to produce a tube blank of the required length. The tube hose may be cut before or after the dispensing assembly is welded in position. Instead of the split cutters shown a rotary cutter, or any other conventional cutting means, may be used. The cut tube blank is then removed by the transfer means.

The cycle of operation is therefore as follows. During an indexing pause the free ends of the folded laminate sheet are welded together to form a tube hose. At the same time the tube hose is cut to length, either before or after a dispensing assembly is attached. Also, during the same pause a dispensing assembly is presented to the end of the tube hose, optionally if necessary adjusted into the correct position, and crimped and welded into position. The crimping tool and other tube grippers are used to withdraw the tube blank from the mandrel. The tube grippers can then open to allow a pick up tool to receive the tube blank. Alternatively, the crimping tool can open and a transfer means is then attached to the dispensing assembly and the cut tube blank is then withdrawn. As this is happening a friction drive indexes the next section of tube hose so that the cut end is placed in position to receive the next dispensing assembly. The cycle then is then repeated.

Figure 2:
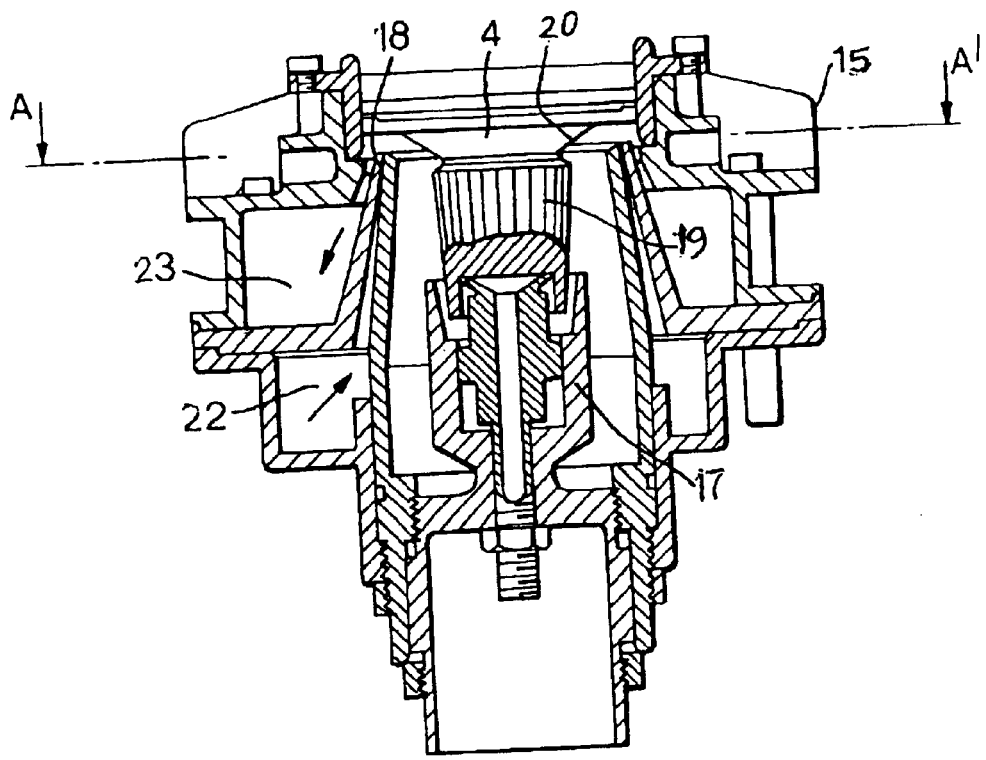
FIG. 2 is a cross section of a transfer mechanism for transferring the dispensing assembly to the tube hose.
Figure 3:
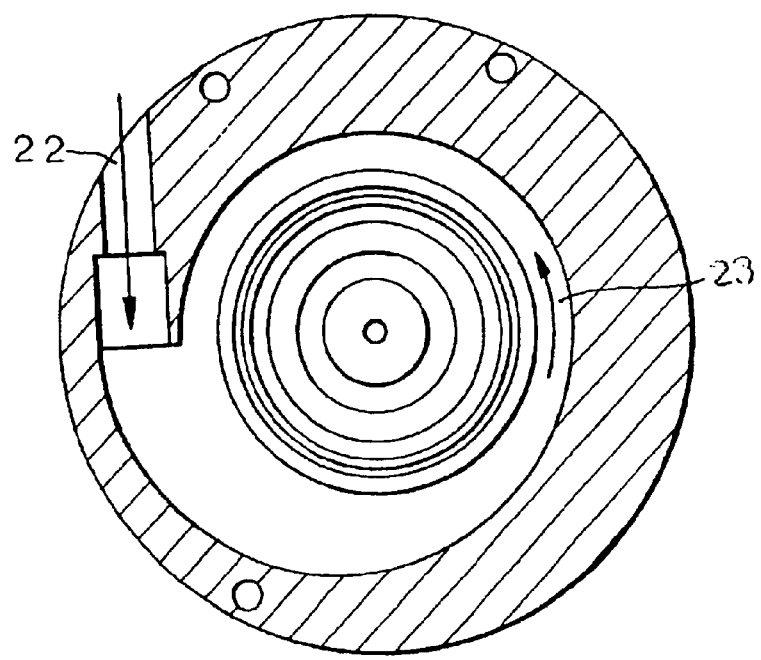
FIG. 3 is a cross section of the same transfer mechanism.

FIGS. 2 and 3 show a preferred design for the mechanism used to present the dispensing assembly to the end of the tube hose. FIG. 2 shows a sectional view of the mechanism (15) and FIG. 3 shows a schematic plan view along section A–A' to illustrate the preferred method of operation.

The mechanism is used both to transfer and to heat the end of the dispensing assembly in preparation for welding/crimping on to the end of the tube hose. This gives longer contact time between the hot air and the dispensing assembly. As shown in FIG. 2 the dispensing assembly (4) is held in position by mechanism (14). Further positioning support is provided by a clamp (17) which grips cap (19) of the dispensing assembly. Whilst the dispensing assembly, which will eventually be joined to the bottom of tube hose, is being transferred it is heated by hot air. The air is supplied by a hose (not shown) to inlet (22) and passes through gap (18) to contact shoulder (20) of dispensing assembly (4) before leaving via exit (23).

As shown in FIG. 3 it is a preferred option that this air be directed in a swirling motion around the dispensing assembly shoulder (20). This increases the air velocity in contact with the dispensing assembly which improves both the rate of heat transfer and the uniformity of heat transfer.

Figure 4:
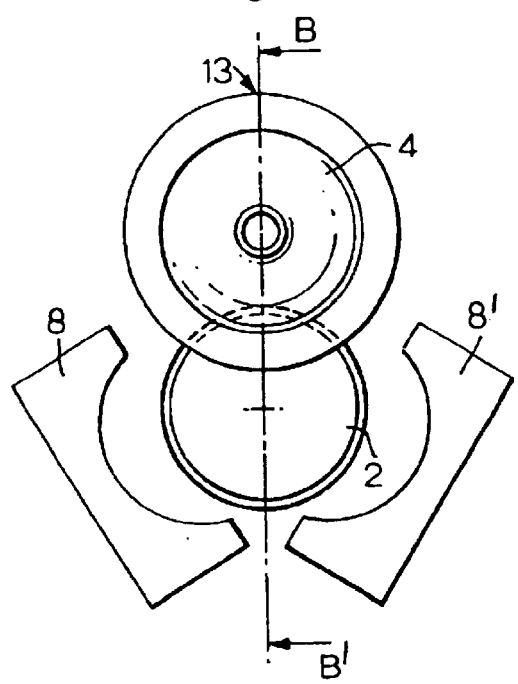
FIG. 4 is an end view of the tube hose, mandrel, crimper and transfer mechanism.

FIG. 4 is an end on view of the mandrel (2), dispensing assembly (4) and a crimper (8) in the form of a pair or splittable jaws (8 and 8'). The jaws are capable of splitting when the crimper is being moved towards or away from the leading edge of the tube hose. This allows other apparatus parts, e.g. the dispensing assembly transfer mechanism (13), to be moved towards or away from the hose end so that time is not wasted in moving parts towards or away from this single area of activity.

Figure 5:
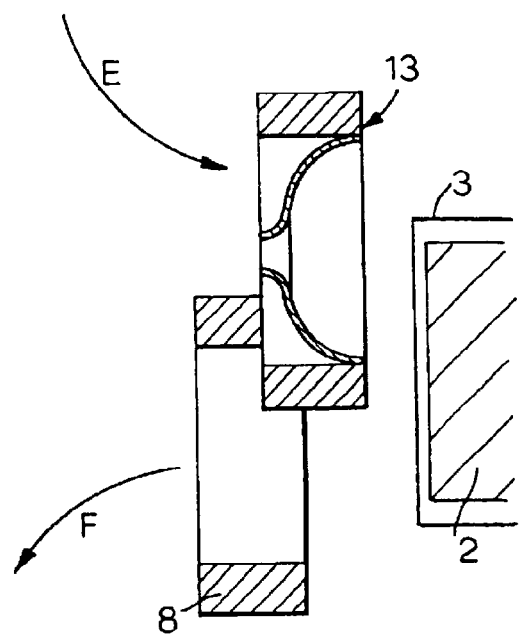
FIG. 5 is a cross section along B–B' of the embodiment according to FIG. 4.

FIG. 5 is a cross section along B–B' of FIG. 4 and shows a crimper (8) jaw and a transfer assembly (13) to illustrate how the jaws of a crimper may be split such that while they are being removed from the environment of the tube hose an alternative device, in this case a transfer mechanism for transferring the dispensing assembly to the tube hose, may approach the tube hose end simultaneously.

The dispensing assembly is transferred along route E while the crimper is simultaneously removed along line F.

Figure 6:
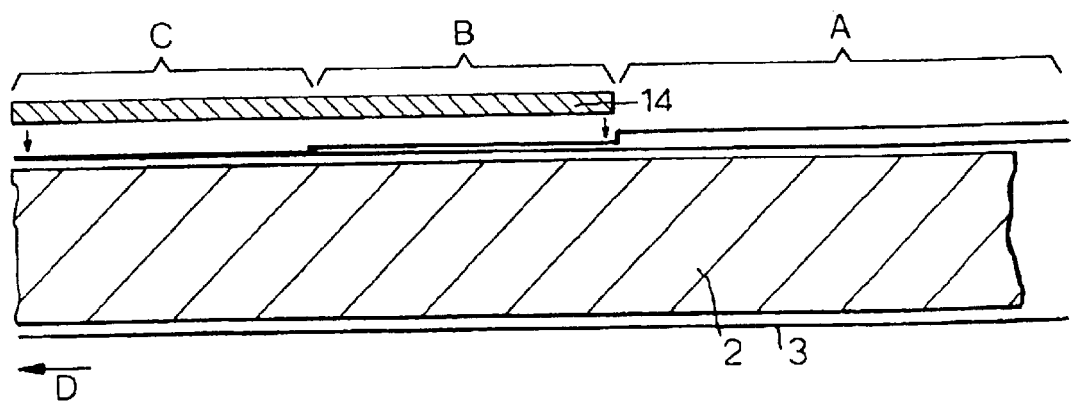
FIG. 6 is a cross section of a mandrel, hose and longitudinal press for sealing the tube hose along its longitudinal overlap.

FIG. 6 is a cross section of a mandrel (2), tube hose (3) and lateral seal press (14) which has a sealing length equal to twice the length of the tube blank. The tube hose advances along the mandrel (2) in indexed stages such that each longitudinal length of the tube hose is contacted twice by the press. Further, for an effective seal, each point along the tube length is required to undergo two seal pressing stages to effect a proper seal. In this way the time taken between each press is reduced and the tube can be moved along in quicker indexed stages.

The tube hose in the figure shows the three different stages of sealing. The first is stage (A) where no sealing has taken place. The tube hose margins are overlapping and unsealed. The second stage (B) is where a first seal press has taken place and here the seal is partial. The third stage (C) is after two presses have taken place and the tube length is properly sealed at its overlapped margins. The tube hose is advanced along the stationary mandrel in indexed stages in direction D.

What we claim is:

1. A process for the manufacture of a tube blank, comprising:
   (a) guiding a sheet of laminate around a mandrel allowing edges of the sheet to overlap, contacting the overlap edges with a section of a sealing press to form a pressed length of a tube hose, advancing the tube hose by an indexed length, re-applying the sealing press to the pressed length and simultaneously pressing overlapping edges of a subsequent length of laminate forming next tube hose;
   (b) advancing the said tube hose along the mandrel such that a leading edge of the tube hose is flush with a leading face of the mandrel;
   (c) presenting a dispensing assembly to the leading edge of the tube hose;
   (d) sealing the dispensing assembly with the tube hose to form a tube blank;
   (e) separating the tube blank from the mandrel.

2. A process according to claim 1, wherein the said dispensing assembly is heated immediately before being applied to the said leading edge of the tube hose.

3. A process according to claim 1, wherein the said dispensing assembly is heated in a transfer means immediately before being applied to the said leading edge of the tube hose.

4. A process according to claim 1, wherein the said dispensing assembly is sealed with the end of the tube hose by a die which can split into at least two parts.

5. A process according to claim 1, wherein the tube blank is cut from the said tube hose and removed for further processing.

6. A process according to claim 1, wherein the position of the tube hose relative to the dispensing assembly is adjusted prior to sealing.

7. A process according to claim 1, wherein the said tube blank is filled as it is removed from the said mandrel after sealing with the dispensing assembly.

8. A process according to claim 7, wherein the tube blank is sealed after it is removed from the mandrel.

9. A process according to claims 7 carried out under sterile conditions.

10. A process according to claim 1 in which the said tube blank is not self-supporting when removed from the said mandrel.

11. A process according to claim 1, wherein the sheet of material laminate is pre-printed with the design or logo to be applied to a finished tube.

12. A process according to claim 1 in which the tube blank when sealed forms a flexible sachet.

13. A process according to claim 1, wherein the said mandrel is stationary throughout the process.

14. A process according to claim 1, wherein the said mandrel is maintained in a substantially vertical position.

15. A process according to claim 1, wherein any sealing stages are carried out by convection heaters.

16. A process according to claim 1, wherein any sealing stages are carried out by conduction heaters.

* * * * *